A. P. HANTSCH.
MAGAZINE PLATE HOLDER.
APPLICATION FILED OCT. 3, 1919.
1,357,164. Patented Oct. 26, 1920.
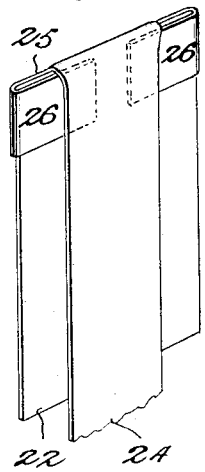
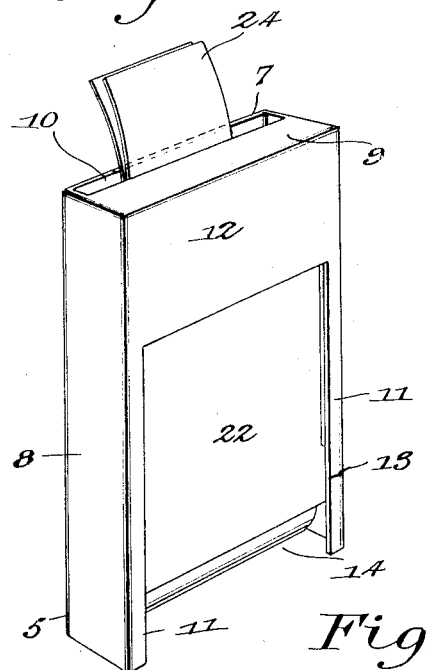
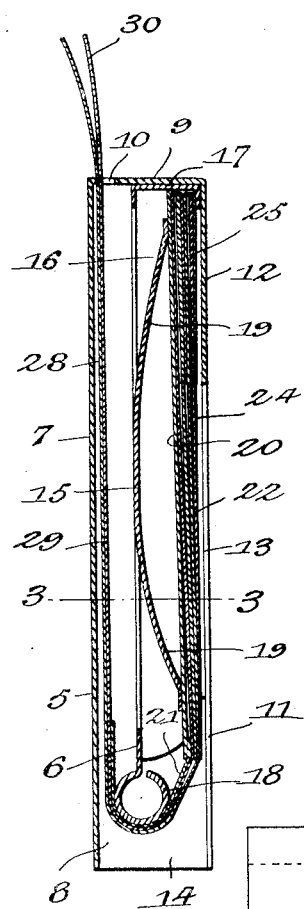
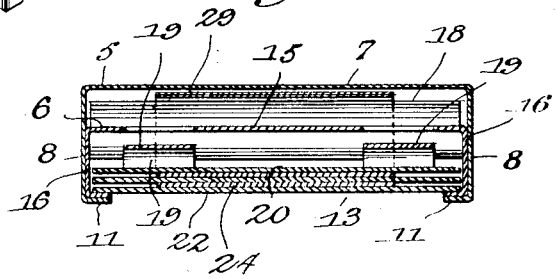
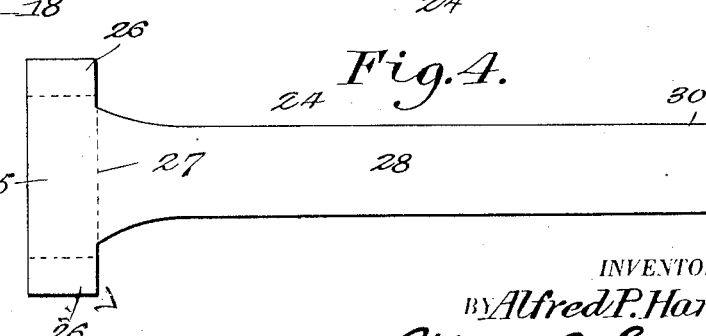
INVENTOR.
BY Alfred P. Hantsch
Victor J. Evans
ATTORNEY.

UNITED STATES PATENT OFFICE.

ALFRED P. HANTSCH, OF NEW BRUNSWICK, NEW JERSEY.

MAGAZINE PLATE-HOLDER.

1,357,164.  Specification of Letters Patent.  Patented Oct. 26, 1920.

Application filed October 3, 1919. Serial No. 328,096.

*To all whom it may concern:*

Be it known that I, ALFRED P. HANTSCH, a citizen of the United States, residing at New Brunswick, in the county of Middlesex and State of New Jersey, have invented new and useful Improvements in Magazine Plate-Holders, of which the following is a specification.

This invention relates to plate holders and more particularly to the construction of a device of this character which may be used in a highly satisfactory manner in connection with films or photographic plates of the design shown in my co-pending application No. 313,689 filed July 28, 1919.

In my co-pending application above referred to, the photographic plate is provided with two portions on its sensitized side, one of which has been previously exposed and adapted to bear a writing which may be uniformly contrasted with the other portion of the sensitized side after the latter has been exposed in the taking of a picture.

An object of the present invention pertains to the provision of a plate holder in which the previously exposed portions of the sensitized surfaces of the films or plates may be protected against the light during the operation of exposing the other section or portion of the film or plate, the protecting means operating also to permit the various films or plates to be singly presented in the presence of the lens of a camera as their use is desired.

Another object of the invention is to provide a plate holder in which the films or photographic plates may be stacked against each other in a relatively compact manner; associating an ejecting mechanism therewith whereby the films or plates can be successively moved and discharged from the pack after they have been exposed to the light, and further associating with the structure a novel form of frame or carrier which is arranged so that the actuating ends of the plate ejecting mechanism can be exposed at the outside of the camera where they can be freely and selectively manipulated.

With the above and other objects in view which will appear as the nature of the invention is better understood, the same consists in the improved construction and novel arrangements of parts which will hereinafter be fully described and particularly pointed out in the claims.

In the accompanying drawings, has been illustrated, a single and preferred form of the invention, it being, however, understood that no limitations are necessarily made to the precise structural details therein exhibited, but that changes, alterations and modifications within the scope of the claims may be resorted to when desired.

Figure 1 is a perspective view of the device.

Fig. 2 is a vertical section therethrough.

Fig. 3 is a section taken on the line 3—3 of Fig. 2.

Fig. 4 is a plan view of one of the ejecting strips.

Fig. 5 is a fragmentary detail perspective view of one of the plates and its ejecting mechanism.

In carrying the invention into practice, use is made of outer and inner frames 5 and 6 respectively, the former adapted to be constructed of paper board and the latter of tin or other suitable well known material. The outer frame 5 includes a back wall 7, parallel sides 8—8, a top wall 9 having a slot 10 therein, and relatively narrow front flanges 11—11. The flanges 11—11 join the top wall 9 by means of a relatively narrow wall 12 and below said wall the outer frame is formed between the flanges 11—11 with a plate exposing opening 13. The bottom 14 of the outer frame is open for a purpose to be hereinafter explained.

The inner frame 6 consists of a main body wall 15, side walls 16—16, a connecting top wall 17 and a base roll 18 of cylindrical formation. From the body wall 15, spring tongues 19 are upstruck, the terminals of which are freely arranged against a follower 20. This construction is such that the follower will be advanced in the direction of the opening 13 in the outer frame 5. The follower is provided at its lower edge with a flexible apron 21 which extends around the base roll 18 of the frame 6.

The photographic films or plates 22 are arranged against the follower 20 so as to be normally held against the flanges 11—11 of the outer frame where they may be singly exposed through the opening 13. The plate ejecting mechanism consists of flexible strips 24, one for each plate and as shown said strips are provided with enlarged ends 25 having a normal width exceeding that of the plate so that the terminals 26 may be folded over against the edges of the plate and the end 25 folded on the dotted line 27 to form a pocket for receiving the previously printed portion of the film, or plate as shown in Fig. 5. After the end 25 has been folded in this manner it will be observed that the extension 28 of the strip will be exposed at the rear side of the plate or film and it is extended in a downward direction and then over the roll 18 and then in an upward direction at 29 so as to cause its actuating terminal 30 to pass through the opening 10 where it will be exposed for manual manipulation.

The two frames 5 and 6 have their side walls in frictional contact so as to prevent movement of one frame within the other when the manipulating terminals 30 are actuated. The terminals 30 of the several ejecting strips are arranged side by side so that they may be selectively actuated to cause a successive movement of the plates or films from the open side 13 of the outer frame 5.

From the foregoing description, it will be observed that when pull is exerted against the manipulating end 30 of the flexible strip 24, pressure will be applied to the pocket portion of the strip so that the plate will be moved and discharged from the pack. The pack may be employed in connection with any well known form of camera wherein means are employed for developing the picture after an exposure is made and the structure as described and shown permits the exposed picture to be delivered directly to the developing bath. When used in this manner, the discharge end 14 will be arranged directly over the developing bath to permit the picture to be dropped therein, as the terminals 30 are manipulated.

What is claimed as new is:—

1. A plate holder comprising, a frame open at one side and at its lower end, a follower mounted in the frame for advancing the plates against the open side of said frame, and ejecting mechanism, consisting of separate strips, one for each plate, said strip having pockets formed therein for the reception of portions of the plates and for separating and concealing said portions, and free actuating terminals formed on said strips and adapted when actuated to singly draw the plates over the side opening of said frame, and through the bottom opening thereof and thereupon release the plates from control by said strip.

2. A plate holder comprising a structure having an opening for exposing the plates to the lens of a camera, said structure having a discharge opening, means for holding plates in stack formation in the presence of both openings, separate ejecting devices for the plates, said devices having free manipulating ends grouped together and adapted to be singly controlled, said devices having portions engaged with the plates to cause the plates to be moved in the direction of the discharge opening as the manipulating ends of the devices are actuated and to automatically release said plates after they have been discharged through said discharge opening.

3. A plate holder comprising a structure having an opening for exposing the plates to the lens of a camera, said structure having a discharge opening, means for holding plates in stack formation in the presence of both openings, separate ejecting devices for the plates, said devices having free manipulating ends grouped together and adapted to be singly controlled, said devices having portions engaged with the plates to cause the plates to be moved in the direction of the discharge opening as the manipulating ends of the devices are actuated and to automatically release said plates after they have been discharged through said discharge opening, and means for yieldingly advancing the plates against said exposing opening.

4. A plate holder comprising a structure having an opening for exposing the plates to the lens of a camera, said structure having a discharge opening, means for holding plates in stack formation in the presence of both openings, separate ejecting devices for the plates, said devices having free manipulating ends grouped together and adapted to be singly controlled, said devices having portions engaged with the plates to cause the plates to be moved in the direction of the discharge opening as the manipulating ends of the devices are actuated, said plate engaging portions of the ejecting devices being of pocket formation and each adapted to conceal a section of the plates during the exposing operation.

5. A plate holder comprising a structure having an opening therein, and separate devices removably secured to the plates for moving the plates away from said opening as the plates are exposed, said devices having actuating ends grouped together and adapted to be selectively manipulated to cause the plates to be moved successively.

6. A plate ejecting strip comprising a broadened head adapted to be bent over the edge of a plate so as to lie in flat contact with one of the major surfaces of the plate and to have the lateral ends bent over the side edges of the plate and into contact with the other major surface thereof.

7. In a device of the class described, the combination of a frame open at one side and at one end, means for ejecting plates from said frame and comprising a plurality of strips, means for advancing plates into exposing relation with the side opening, and means fixedly secured to said frame and forming backing means for said plate-advancing means and guiding means for said strips.

In testimony whereof I have affixed my signature.

ALFRED P. HANTSCH.